(12) United States Patent
Tajiri et al.

(10) Patent No.: US 10,738,923 B2
(45) Date of Patent: Aug. 11, 2020

(54) FLEXURAL SPRING-ENERGIZED INTERFACE FOR BELLOWED BALL-JOINT ASSEMBLIES FOR CONTROLLED ROTATIONAL CONSTRAINT

(71) Applicant: Unison Industries, LLC, Jacksonville, FL (US)

(72) Inventors: Gordon Tajiri, Allentown, PA (US); Michael Thomas Kenworthy, Beavercreek, OH (US); Douglas R. Millward, Beavercreek, OH (US); Lonnie Ray Stewart, Jr., Carlisle, OH (US)

(73) Assignee: Unison Industries LLC, Jacksonville, FL (US)

( * ) Notice: Subject to any disclaimer, the term of this patent is extended or adjusted under 35 U.S.C. 154(b) by 251 days.

(21) Appl. No.: 15/742,049

(22) PCT Filed: May 4, 2016

(86) PCT No.: PCT/US2016/030749
§ 371 (c)(1),
(2) Date: Jan. 5, 2018

(87) PCT Pub. No.: WO2017/007530
PCT Pub. Date: Jan. 12, 2017

(65) Prior Publication Data
US 2018/0202591 A1    Jul. 19, 2018

Related U.S. Application Data

(60) Provisional application No. 62/190,484, filed on Jul. 9, 2015, provisional application No. 62/190,528, filed on Jul. 9, 2015.

(51) Int. Cl.
*F16L 27/11* (2006.01)
*F16L 51/02* (2006.01)
(Continued)

(52) U.S. Cl.
CPC ............. *F16L 27/11* (2013.01); *F16L 27/073* (2013.01); *F16L 51/025* (2013.01);
(Continued)

(58) Field of Classification Search
CPC ......... F16L 27/11; F16L 27/073; F16L 27/04; F16L 27/1004; F16L 51/026; F16L 51/025; F16L 51/027
(Continued)

(56) References Cited

U.S. PATENT DOCUMENTS

| 1,974,780 A | 9/1934 | Mann |
| 2,376,995 A | 5/1945 | Fisher |

(Continued)

FOREIGN PATENT DOCUMENTS

| CA | 1310349 C | 11/1992 |
| CA | 2037170 C | 12/1999 |

(Continued)

OTHER PUBLICATIONS

International Search Report and Written Opinion issued in connection with corresponding PCT Application No. PCT/US2016/030749 dated Jul. 28, 2016.

(Continued)

*Primary Examiner* — Zachary T Dragicevich
(74) *Attorney, Agent, or Firm* — McGarry Bair PC (57) ABSTRACT

A turbine engine duct assembly including a joint assembly having an outer shroud, a bellows, a flared tube, a backing ring, and a kinematic ring. The joint assembly provides for dynamic movement of the duct assembly during operation of the engine. Such dynamic movement can be resultant of vibrational forces or thermal expansion of the engine. The joint assembly permits such dynamic movement without excessive system stiffness.

16 Claims, 5 Drawing Sheets

(51) Int. Cl.
*F16L 27/073* (2006.01)
*F01D 9/06* (2006.01)
*F01D 11/00* (2006.01)
*F02C 7/28* (2006.01)

(52) U.S. Cl.
CPC ........... *F16L 51/026* (2013.01); *F16L 51/027* (2013.01); *F01D 9/06* (2013.01); *F01D 11/005* (2013.01); *F02C 7/28* (2013.01); *F05D 2230/642* (2013.01); *F05D 2240/11* (2013.01); *F05D 2240/14* (2013.01); *F05D 2250/241* (2013.01); *F05D 2250/611* (2013.01); *F05D 2300/224* (2013.01)

(58) Field of Classification Search
USPC ...................................... 285/226, 227, 145.5
See application file for complete search history.

(56) References Cited

U.S. PATENT DOCUMENTS

| | | | |
|---|---|---|---|
| 2,974,780 | A | 7/1952 | Kaysing et al. |
| 2,613,087 | A | 10/1952 | Alford |
| 2,712,456 | A | 7/1955 | McCreery |
| 2,826,437 | A | 3/1958 | Detweiler et al. |
| 2,840,394 | A | 6/1958 | Rohr |
| 3,549,176 | A | 12/1970 | Contreras et al. |
| 3,995,896 | A | 12/1976 | Decker |
| 4,165,107 | A | 8/1979 | Affa et al. |
| 4,427,220 | A | 1/1984 | Decker |
| 4,643,463 | A | 2/1987 | Hailing et al. |
| 4,645,244 | A | 2/1987 | Curtis |
| 4,652,025 | A | 3/1987 | Conroy, Sr. |
| 4,659,117 | A * | 4/1987 | Holzhausen ............... 285/226 |
| 4,893,847 | A | 1/1990 | Hess |
| 4,911,482 | A * | 3/1990 | Doat ............ F16L 27/073 285/226 |
| 5,286,071 | A | 2/1994 | Storage |
| 5,505,498 | A | 4/1996 | Halling et al. |
| 5,611,577 | A | 3/1997 | Meyer et al. |
| 6,354,632 | B1 * | 3/2002 | Jung ............ F16L 51/027 285/226 |
| 2002/0041095 | A1 | 4/2002 | Shin |
| 2004/0178628 | A1 * | 9/2004 | Laubie ..................... 285/226 |
| 2006/0266049 | A1 | 11/2006 | Storage et al. |
| 2009/0309355 | A1 | 12/2009 | Turfait et al. |

FOREIGN PATENT DOCUMENTS

| | | |
|---|---|---|
| CN | 202868184 U | 4/2013 |
| CN | 103697266 A | 4/2014 |
| CN | 203703442 U | 7/2014 |
| EP | 0 662 580 A1 | 7/1995 |
| EP | 1 164 326 B1 | 7/2006 |
| FR | 510417 A | 12/1920 |
| GB | 607336 A | 8/1948 |
| GB | 1 603 914 A | 12/1981 |
| GB | 2 107 816 B | 8/1984 |
| JP | 3884511 B2 | 2/2007 |

OTHER PUBLICATIONS

International Preliminary Report on Patentability issued in connection with corresponding PCT Application No. PCT/US2016/030749 dated Jan. 9, 2018.

Tajiri, G., et al., Compliant flexural inner shroud for bellowed spherical flex-joint assemblies for reduced dynamic rotational stiffness, GE co-pending U.S. Appl. No. 62/190,528, filed Jul. 9, 2015.

* cited by examiner

FLEXURAL SPRING-ENERGIZED INTERFACE FOR BELLOWED BALL-JOINT ASSEMBLIES FOR CONTROLLED ROTATIONAL CONSTRAINT

CROSS-REFERENCE TO RELATED APPLICATION(S)

This application is the National Stage of International Application No. PCT/US2016/030749 filed May 4, 2016, which claims the benefit of U.S. Provisional Application No. 62/190,484 filed on Jul. 9, 2015, entitled Flexural Spring-Energized Interface for Bellowed Ball-Joint Assemblies for Controlled Rotational Constraint, and U.S. Provisional Application No. 62/190,528 filed on Jul. 9, 2015, entitled Compliant Flexural Inner Shroud for Bellowed Spherical Flex-Joint Assemblies for Reduced Dynamic Rotational Stiffness, which are incorporated herein by reference in their entirety.

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Duct assemblies are provided about the turbine engine and provide conduits for the flow of various operating fluids to and from the turbine engine. One of the operating fluids is bleed air. In the compressor stages, bleed air is produced and taken from the compressor via feeder ducts. Bleed air from the compressor stages in the gas turbine engine can be utilized in various ways. For example, bleed air can provide pressure for the aircraft cabin, keep critical parts of the aircraft ice-free, or can be used to start remaining engines. Configuration of the feeder duct assembly used to take bleed air from the compressor requires rigidity under dynamic loading, and flexibility under thermal loading. Current systems use ball joints or axial joints in the duct to meet requirements for flexibility, which compromise system dynamic performance by increasing the weight of the system.

BRIEF DESCRIPTION OF THE INVENTION

In one aspect, the present disclosure relates to a duct assembly for a gas turbine engine including a first duct, a second duct, and a joint assembly coupling the first duct to the second duct. The joint assembly includes an outer shroud having an inner surface defining an interior of the joint assembly and a bellows disposed within the interior with a first end of the bellows surrounding an outer surface end portion of the first duct and a second end of the bellows surrounding an outer surface end portion of the second duct. The joint assembly further includes an annular flared tube having a flared portion located within the interior and a longitudinal portion extending beyond the outer shroud, a kinematic ring disposed adjacent the flared portion of the annular flared tube and the inner surface of the outer shroud, and a backing ring retaining the kinematic ring within the interior.

In another aspect, the present disclosure relates to a joint assembly including an outer shroud having an inner surface defining an interior of the joint assembly and a bellows disposed within the interior and configured to fluidly couple with first and second ducts to be fluidly joined by the joint assembly. The joint assembly further includes an annular flared tube having a flared portion located within the interior between the inner surface and the bellows and having a longitudinal portion extending beyond the outer shroud, a kinematic ring disposed adjacent the flared portion of the annular flared tube and the interior surface of the outer shroud, and a backing ring retaining the kinematic ring within the interior.

In yet another aspect, the present disclosure relates to a joint assembly including an outer shroud having an inner surface defining an interior of the joint assembly, a bellows disposed within the interior and configured to fluidly couple with first and second ducts to be fluidly joined by the joint assembly, an inner shroud located within the interior between the inner surface and the bellows and having an annular exterior surface, and a ring disposed between the annular exterior surface of the inner shroud and the interior surface of the outer shroud and configured to provide a compliant interface that accounts for the shape distortions or surface artifacts in the outer shroud or the inner shroud.

DESCRIPTION OF EMBODIMENTS OF THE INVENTION

The described embodiments of the present invention are directed to providing a pre-loaded, compliant bellowed spherical flex-joint for constrained kinematic geometry and reduced reaction loading into the fan case of turbine engines during assembly and thermal growth of high temperature bleed-air ducting systems. For purposes of illustration, the present invention will be described with respect to an aircraft gas turbine engine. Gas turbine engines have been used for land and nautical locomotion and power generation, but are most commonly used for aeronautical applications such as for airplanes, including helicopters. In airplanes, gas turbine engines are used for propulsion of the aircraft. It will be understood, however, that the invention is not so limited and can have general applicability in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
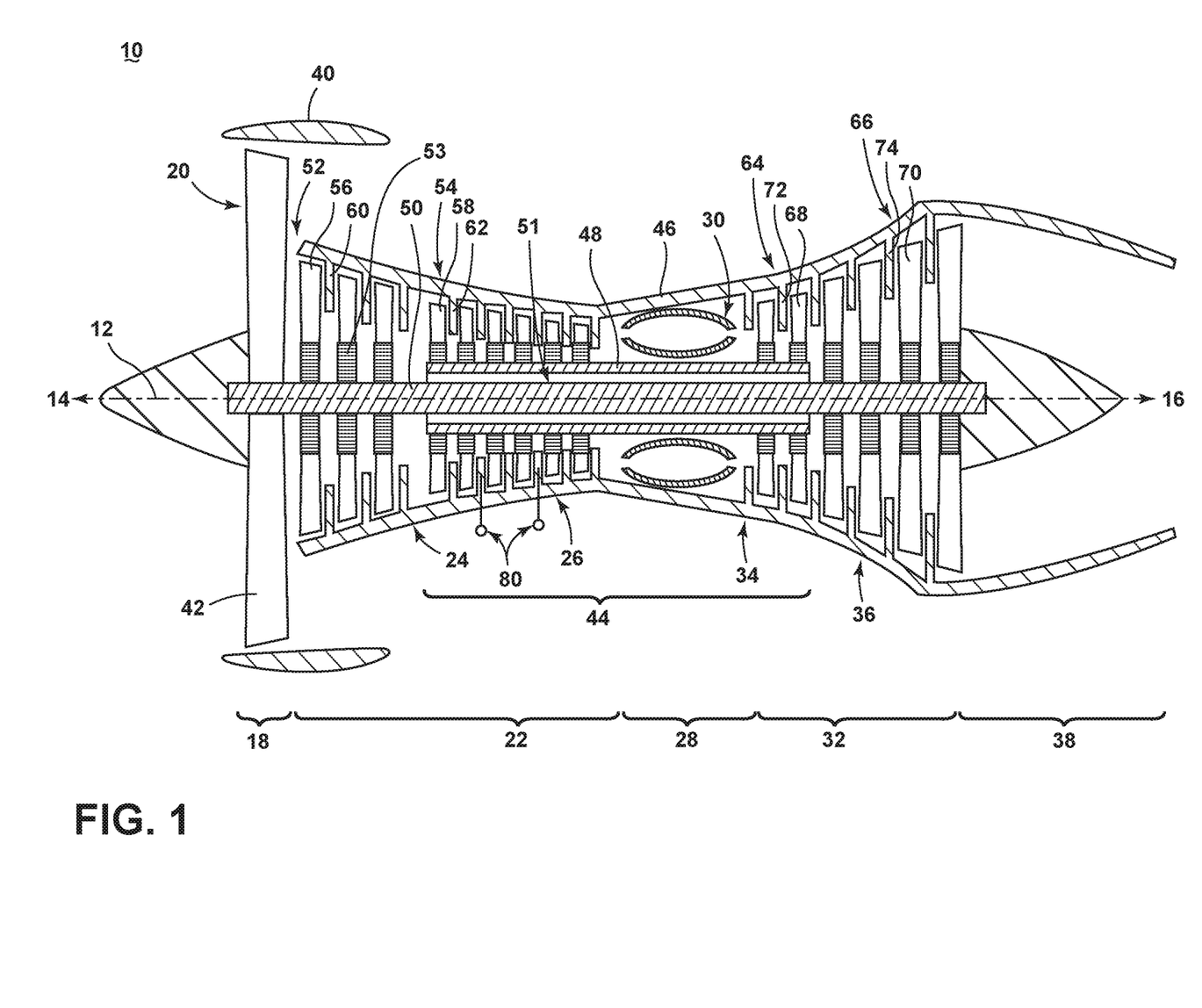
FIG. 1 is a schematic cross-sectional view of a gas turbine engine with a bleed air ducting assembly in accordance with various aspects described herein.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more bleed air duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Figure 2:
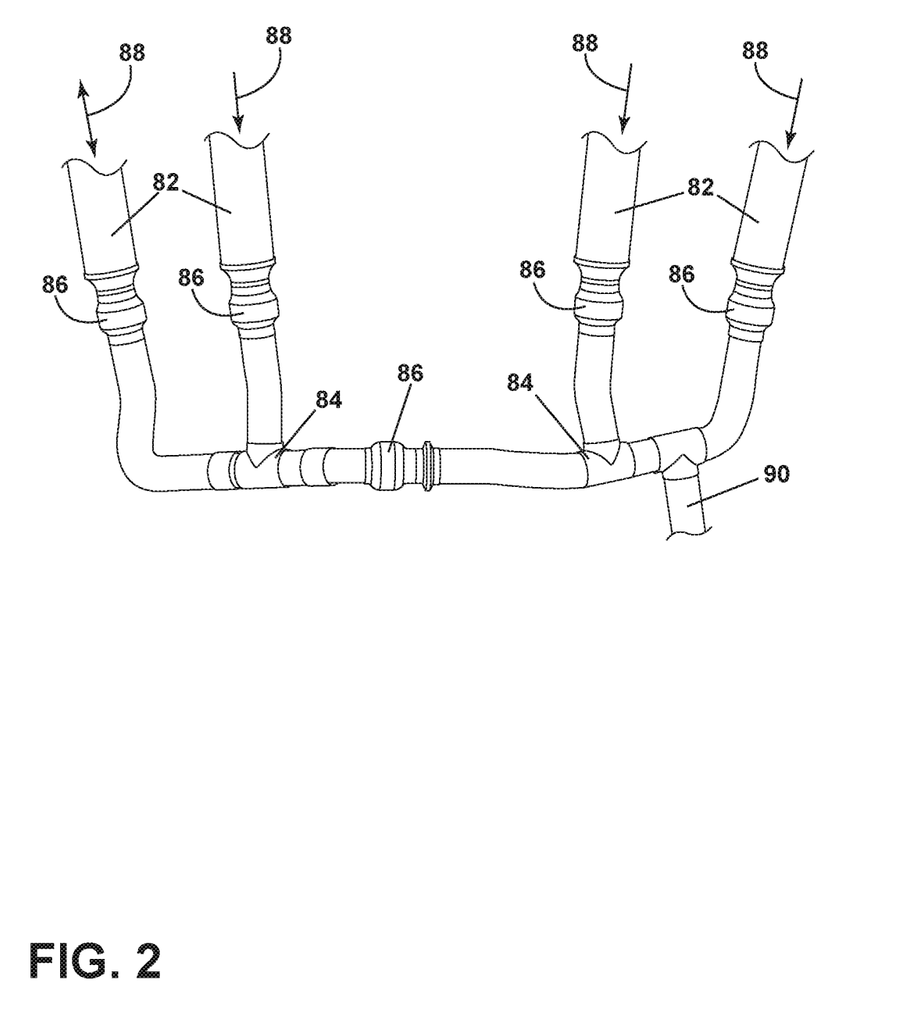
FIG. 2 is a perspective view of the bleed air ducting assembly having multiple ball joints in accordance with various aspects described herein.

Referring to FIG. 2, an exemplary bleed air duct assembly 80 includes radially inner first ducts 82 and radially outer second ducts 84. The first and second ducts 82, 84 can be fixed in their position. A joint assembly 86, which can include, but is not limited to, a ball-joint, axial joint, etc. couples the first and second ducts 82, 84. A flow of bleed air 88 can be drawn from the compressor section 22 into the first ducts 82, through the second ducts 84, and provided to an exhaust duct 90 for use in various other portions of the engine 10 or aircraft. The flow of bleed air 88 can act to heat and expand portions of the bleed air duct assembly 80. As the first and second ducts 82, 84 can be fixed the joint assembly 86 provides for reducing or mitigating forces acting on the bleed air duct assembly 80 such as vibration or thermal expansion, while providing for operational flexion of the bleed air duct assembly 80.

Figure 3:
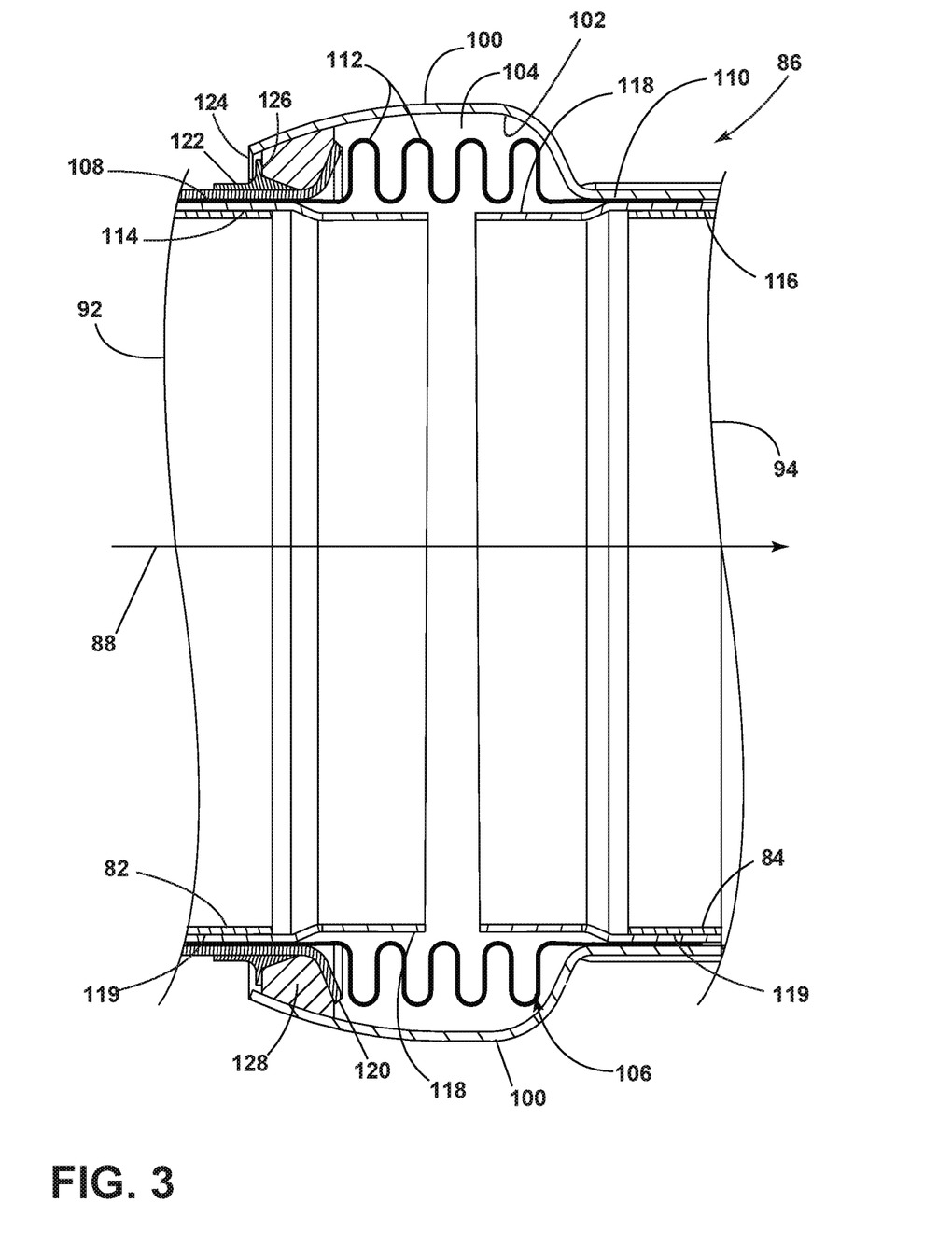
FIG. 3 is a cross-sectional view of the ball-joint of FIG. 2 in accordance with various aspects described herein.

FIG. 3 illustrates an exemplary joint assembly 86, which can be utilized to fluidly couple desired first and second ducts. The exemplary joint 86 is a ball joint and is shown in more detail in the cross-sectional view. More specifically, a rounded casing or outer shroud 100 is illustrated as including an inner surface 102 that at least partially defines a joint interior 104. The outer shroud 100 can be a single integral piece, or can be a combination of multiple pieces to form the annular shroud 100. The flow of bleed air 88, illustrated with an arrow, through the joint assembly 86 can define an upstream side 92 and a downstream side 94 of the joint assembly 86.

A bellows 106 is disposed within the joint interior 104 radially interior of the outer shroud 100. The bellows 106 has a first end 108 spaced from a second end 110. A number of convolutions 112 can be included between the first end 108 and the second end 110. While the convolutions 112 have been illustrated as having a sinusoidal profile this need not be the case. The bellows 106 can be formed from a flexible material and the convolutions 112 therein permitting expansion or contraction of the bellows 106. The bellows 106 is disposed within the interior 104 to fluidly couple the first and second ducts 82, 84 within the joint assembly 86.

The bellows 106 can be held in position within the joint interior 104 via a first fitting 114 and a second fitting 116. The first fitting 114 and the second fitting 116 are located radially interior of the outer shroud 100 and further define the joint interior 104. An outer surface 118 of the first fitting 114 and second fitting 116 abuts the inner surface 102 of the outer shroud 100 to form a kinematic interface. Similarly, an outer surface 119 of the first and second ducts 82, 84 abuts the first and second fittings 114, 116 to form a second kinematic interface. The kinematic interfaces can be interference fit, press fit, or otherwise mounted within the joint assembly 86. In the illustrated example, the first fitting 114 retains the first end 108 of the bellows 106 within the outer shroud 100 and the second fitting 116 retains the second end 110 of the bellows 106. It will be understood that the joint assembly 86 can be mounted or otherwise operably coupled to the first and second ducts 82, 84 in any suitable manner including utilizing the first fitting 114 and the second fitting 116.

An inner shroud or annular flared tube 120 is disposed within the outer shroud 100. More specifically, the annular flared tube 120 is mounted between the outer shroud 100 and the bellows 106. While the annular flared tube 120 is illustrated on the upstream side 92 it will be understood that the annular flared tube 120 could alternatively be located on the downstream side 94. The annular flared tube 120 can include a transition portion transitioning between axial to a radial orientation.

Frictional forces are present between the outer shroud 100 and the annular flared tube 120 due to out of roundness errors created during manufacturing, local surface imperfections, and asymmetric thermal growth distortions of the outer shroud 100. These distortions and imperfections are difficult to quantify and control during the manufacturing process and can create slop and vibration within the system. The macro-level distortions and micro-level imperfections dynamically alter the surface interaction geometry at the interface between the annular flared tube 120 and the outer shroud 100. The dynamic load and temperature dependent changes are unique for individual assemblies and can be difficult to measure and predict.

The joint assembly 86 is illustrated as including compliant interface features, which act to reduce the local peak magnitudes of frictional forces between the annular flared tube 120 and the outer shroud 100. More specifically, a ramped backing ring 122 is disposed within the joint interior 104 at an upstream edge 124 of the outer shroud 100. A ramped portion 126 is provided on a side of the ramped backing ring 122 facing the downstream side 94.

The ramped portion 126 of the backing ring 122, flared tube 120, and outer shroud 100 define the annular cavity 104. A conforming kinematic ring 128 can be disposed in that annular cavity 104. The kinematic ring 128 is a die-formed low-friction kinematic seal ring between the flared tube 120, the outer shroud 100, and the backing ring 122. The kinematic ring 128 can be shaped to abut the flared tube 120, the outer shroud 100, and the ramped portion 126 of the backing ring 122. The ramped portion 126 of the backing ring 122 retains the kinematic ring 128 within the interior 104 of the joint assembly 86. The kinematic ring 128 can include, but is not limited to, an interface ring that allows for wear and pre-loading. The kinematic ring 128 can be formed from any suitable material including, but not limited to, a graphite or composite graphite-metal material that allows the kinematic ring 128 to conform to the space within the joint assembly 86. The kinematic ring 128 can be formed such that as it wears it conforms better to the surfaces defining the annular cavity 104.

During the wiped die-forming process of the outer shroud 100 over the low-friction compliant kinematic ring 128, a residual pre-load can be developed. The residual pre-load is stored during the flexing of the flared tube 120 that is loaded during the forming of the outer shroud 100. When the forming load for the outer shroud is removed, the flared tube 120 will spring back to load the kinematic ring 128 against the inner surface 102 of the outer shroud 100. Magnitude of this stored load is dependent on the forming die geometry and the associated compliance of the annular flared tube 120 and can be tuned and controlled. The transfer of the process load can be further controlled by the geometry of the ramped portion 126 of the backing ring 122. Such a geometry can be used during the die-forming process to drive the kinematic ring 128 into the flared tube 120. The spring elements of the flared tube 120 are pre-loaded to maintain contact between the kinematic ring 128 and the inner surface 102 of the outer shroud 100. This interaction creates a zero-backlash interface.

Figure 4:
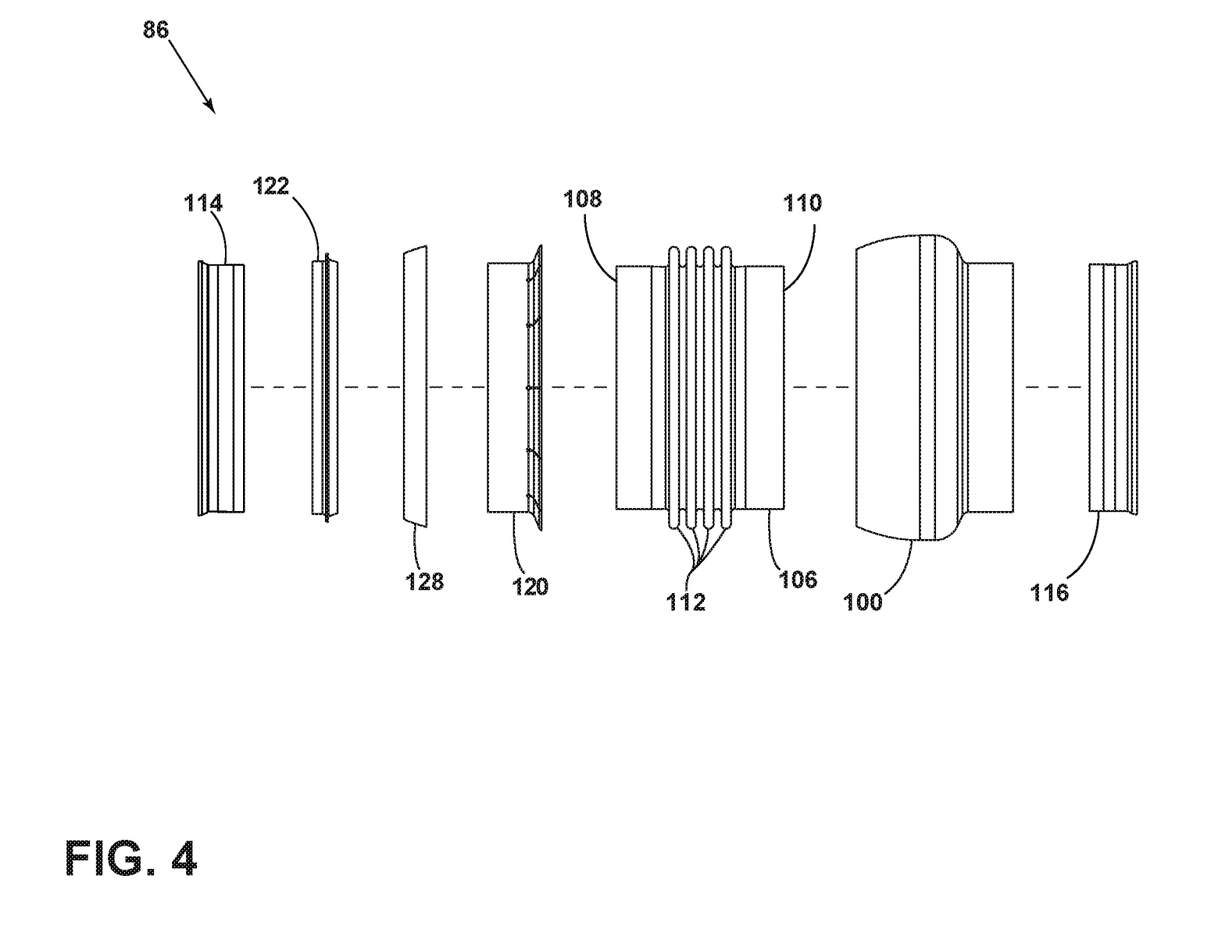
FIG. 4 is an exploded view of the ball joint having a flared tube in accordance with various aspects described herein.

Looking at FIG. 4, an exploded view further illustrates the combination of the elements included in the joint assembly 86. In flow-wise order, from upstream to downstream, the backing ring 122, kinematic ring 128, and annular flared tube 120 will abut one another. The bellows 106 mounts around portions of the first and second fittings 114, 116 to mount to the first and second ducts 82, 84, such that the convolutions 112 are disposed between the first and second ducts 82, 84. The outer shroud 100 encases the backing ring 122, kinematic ring 128, annular flared tube 120, and convolutions 112, sandwiching the components between the ducts 82, 84 and the outer shroud 100. The joint assembly 86 when it is installed is preloaded so that the joint assembly 86 maintains its geometry after being installed.

During operation, movement of the engine 10, such as vibration or thermal expansion, can cause compression or expansion of the bellows 106. The bellows 106 provides for movement and flexion of the bleed air duct assembly 80 where excessive system rigidity would otherwise lead to damage or malfunction of the duct assembly 80. The bellows 106, however, does not provide for additional macro-level distortions and micro-level imperfections such as the magnitude of frictional forces between the outer shroud 100 and the fittings 114, 116, roundness error of the outer shroud 100 and fittings 114, 116 during manufacture, local surface imperfections, or asymmetric thermal growth of the joint assembly 86. These distortions and imperfections can dynamically alter the surface interaction between the outer shroud 100 and other surfaces. The dynamic load and temperature dependent changes are unique to individual joint assemblies 86 and are difficult to measure and anticipate. Therefore, a dynamically compliant interface created in part by the kinematic ring 128 is required to account for these distortions and imperfections.

Figure 5:
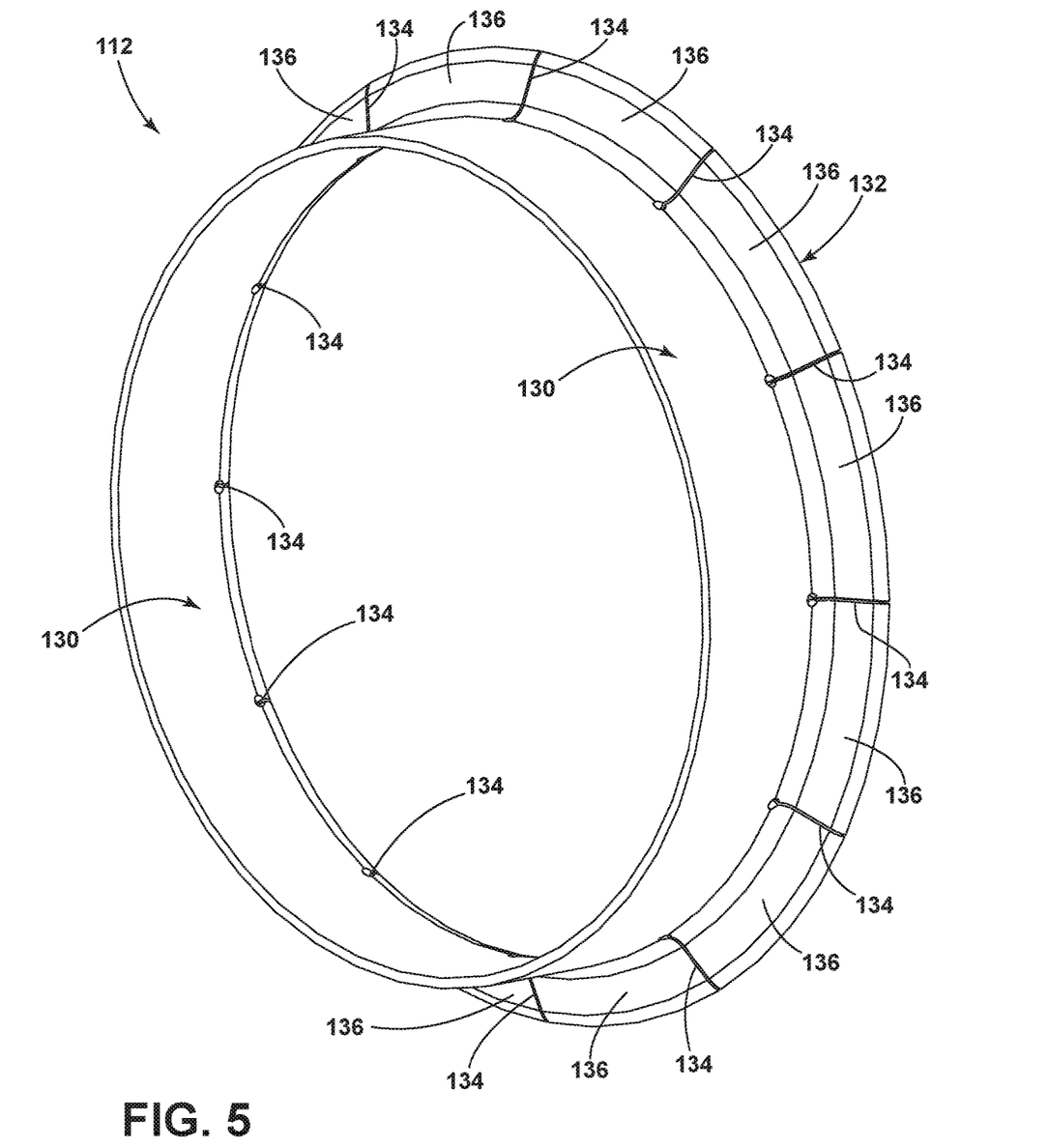
FIG. 5 is a perspective view of the flared tube of FIG. 4 in accordance with various aspects described herein.

Looking at FIG. 5, the flared tube 120 can be separated into a longitudinal portion 130 and a flared portion 132. The longitudinal portion 130 can extend beyond the outer shroud 100 over the annular first end 108 of the bellows 106. The flared portion can be located within the interior 104 of FIG. 3 and can be disposed adjacent to the kinematic ring 128 and the inner surface 102 of the outer shroud 100. The flared portion 132 can include a set of slits 134 which can define a set of flexures 136 disposed around the flared tube 120. The slits 134 can extend partially or fully through the flared portion 132 or even into the longitudinal portion 130, defining the flexures 136 within the flared portion 132 and potentially extending into the longitudinal portion 130. While the flexures 136 are illustrated as evenly spaced, it is also contemplated that the flexures 136 can be unevenly spaced or designed to be larger, smaller, wider, thinner, or otherwise oriented to adapt to the particular needs of the particular joint assembly 86. Details of the set of flexures can be found in U.S. Application No. PCT/US2016/030724, which is incorporated herein by reference in its entirety. The flexures 136 can operate as a biasing element, or a spring, to kinematically constrain and dynamically conform to the interface between the outer shroud 100 and the kinematic ring 128. For example, the flexures 136 can operate as discrete springs which can flex in either a upstream direction or a downstream direction based upon the local movement or growth of the joint assembly 86 based upon the macro-level and micro-level distortions and imperfections. As such, the flared tube 120 and kinematic ring 128 can operate as a compliance, zero-backlash interface that can dynamically conforms to local changes of the joint assembly 86 during operation. Furthermore, the flexures 136 can further reduce rotational or torsional stiffness of the duct assembly 80, providing for greater variable movement at the joint assembly 86.

In this manner, a dynamically compliant interface surface is provided to account for the macro-level shape distortions and micro-level surface features. The kinematic ring 128 provides a compliant zero-backlash interface surface design will add spring-energized flexures to kinematically constrain and dynamically conform at the interface between the outer shroud 100 and the conforming kinematic ring 128. One advantage is the unique combination of compliant and conforming features, including the flared tube 120, the ramped backing ring 122, and the kinematic ring 128, minimize or remove the residue interface mismatch of two mating surfaces. These enhancements do not significantly affect the current manufacturing process, and do not require additional or new tooling. The kinematic ring 128 provides an almost ideal uniform force distribution.

The above described disclosure allows for zero-backlash installation geometry, which is important to reducing potential system loading during system pressurization. Additionally, the developed thrust load and operating geometry of the bellows 106 are related to the operating pressures and thermal growth. With the use of similar thermal growth materials, the differential pressure load can dominate such effects. As the bellows 106 expands, the thrust load increases. The macro-level distortions and the micro-level imperfections further contribute to the interface loads, which contribute to a total interface load. The zero-backlash design alleviates the thrust load and differential pressures, reducing the rotational stiffness and operational loads to the joint assembly 86. The multiple flexures 136 at the kinematic ring 128 can alleviate these effects and reduce the rotational stiffness effects due to the differential pressure magnitudes.

Furthermore, the combination of the flared tube 120, the ramped backing ring 122, and the kinematic ring 128 minimize the residue interface mismatch of the two mating surfaces between the fittings 114, 116 and the outer shroud 100. The joint assembly 86 can be optimized for high-cycle fatigue and ring wear and loading.

It should be appreciated that during forming of the outer shroud 100 over the kinematic ring 128, a residual pre-load can exist. Additionally, during thermal growth and differential pressures during operation, the load on the interface surfaces of the bellows increases. These increased loads in combination with the macro-level distortions and the micro-level imperfections contribute to an overall surface load which can be local or discrete. The flared tube 120 having the flexures 136 provides a compliant, zero-backlash design that can reduce rotational stiffness and uneven operational loads to the duct assembly 80. As the kinematic ring 128 wears it conforms better to the elements around it.

The above disclosure provides a variety of benefits including that a pre-loaded, compliant bellowed spherical flex-joint can be provided and can have a constrained kinematic geometry and reduced reaction loading during assembly and thermal growth of high-temperature bleed-air ducting systems.

To the extent not already described, the different features and structures of the various embodiments can be used in combination as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A duct assembly for a gas turbine engine, comprising:
   a first duct;
   a second duct; and
   a joint assembly coupling the first duct to the second duct and comprising:
   an outer shroud having an inner surface defining an interior of the joint assembly,
   a bellows disposed within the interior with a first end of the bellows surrounding an outer surface end portion of the first duct and a second end of the bellows surrounding an outer surface end portion of second duct;
   an annular flared tube having a flared portion located within the interior, a longitudinal portion extending beyond the outer shroud, and a set of slits along at least a portion of the flared portion to define a set of flexures;
   a kinematic ring disposed adjacent the flared portion of the annular flared tube and the inner surface of the outer shroud; and
   a backing ring retaining the kinematic ring within the interior.

2. The duct assembly of claim 1 wherein the flared tube is upstream of the bellows relative to an airflow through the duct assembly.

3. The duct assembly of claim 1 wherein the set of flexures are evenly spaced.

4. The duct assembly of claim 3 wherein the slits extend to a transition portion of the annular flared tube that is located between the flared portion the longitudinal portion.

5. The duct assembly of claim 4 wherein the kinematic ring is pre-loaded against the flared portion of the annular flared tube.

6. The duct assembly of claim 4 wherein the flare tube includes a flared portion and a longitudinal portion and the slits extend through the flared portion and into the longitudinal portion.

7. The duct assembly of claim 1 wherein the kinematic ring is formed from graphite or a composite graphite-metal material.

8. The duct assembly of claim 1 wherein the backing ring further comprises a ramped portion that has a geometry that is configured to control the transfer of process loads to the kinematic ring.

9. The duct assembly of claim 1 wherein the joint assembly is a ball-joint assembly.

10. A joint assembly, comprising:
an outer shroud having an inner surface defining an interior of the joint assembly,
a bellows disposed within the interior and configured to fluidly couple with first and second ducts to be fluidly joined by the joint assembly;
an annular flared tube having a flared portion located within the interior between the inner surface and the bellows, a longitudinal portion extending beyond the outer shroud, and a set of slits defining a set of flexures;
a kinematic ring disposed adjacent the flared portion of the annular flared tube and the interior surface of the outer shroud; and
a backing ring retaining the kinematic ring within the interior.

11. The joint assembly of claim 10 wherein the set of flexures are evenly spaced.

12. The joint assembly of claim 11 wherein the flared tube includes a flared portion and the slit extend through a portion of the flared portion.

13. The joint assembly of claim 10 wherein the kinematic ring comprises a conforming kinematic seal.

14. A joint assembly, comprising:
an outer shroud having an inner surface defining an interior of the joint assembly,
a bellows disposed within the interior and configured to fluidly couple with first and second ducts to be fluidly joined by the joint assembly;
an inner shroud located within the interior between the inner surface of the outer shroud and the bellows and having an annular exterior surface;
an annular flared tube having a flared portion located within the interior between the bellows and the inner surface of the outer shroud, with the flared portion having a set of slits defining a set of flexures; and
a ring disposed between the annular exterior surface of the inner shroud and the interior surface of the outer shroud and configured to provide a compliant interface that accounts for shape distortions or surface artifacts in the outer shroud or the inner shroud.

15. The joint assembly of claim 14 wherein the ring is pre-loaded against a portion of the inner shroud.

16. The joint assembly of claim 14 wherein the ring is a die-formed ring.

* * * * *